Sept. 18, 1934. G. ROSENQVIST 1,973,782
COMPOSITE MATRIX FOR PRINTING PLATES
Filed May 31, 1932
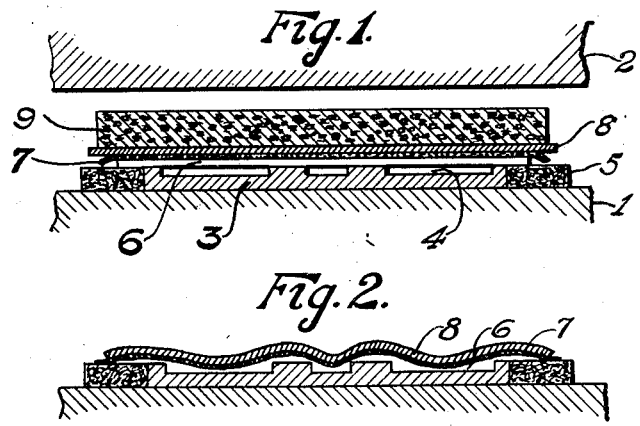
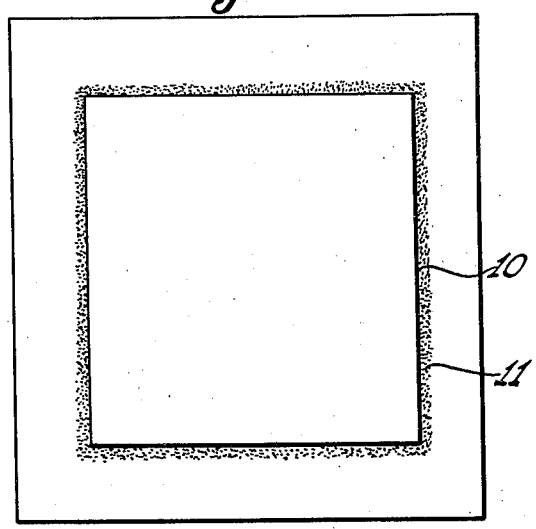
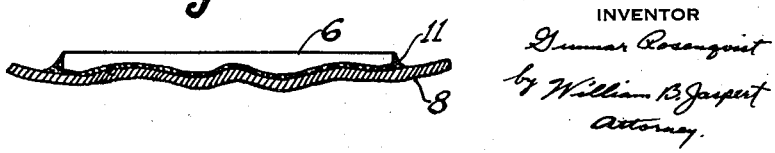
INVENTOR
Gunnar Rosenqvist
by William B. Jaspert
Attorney.

Patented Sept. 18, 1934

1,973,782

UNITED STATES PATENT OFFICE 1,973,782

COMPOSITE MATRIX FOR PRINTING PLATES

Gunnar Rosenqvist, Oakmont, Pa.

Application May 31, 1932, Serial No. 614,431

5 Claims. (Cl. 41—25)

This invention relates to composite matrices for printing plates and the method of making the same, and the present application is a continuation in part of an application bearing Serial No. 584,473 filed January 2, 1932.

In the aforementioned application I have described a method of making matrices for printing plates which consists of compounding a plurality of sheets of fibrous material such as paper, with layers of wax, to form an impression on a wax surface which constitutes the matrix surface of a mold from which electro-types may be manufactured.

In accordance with the present invention, the same general principle of a composite matrix consisting of fibrous sheet material and a layer of wax is employed, but greatly simplified, and the invention further provides for means of preparing the plate after it is formed to render it usable for the making of electro-plates by galvanoplastic process.

The objects of the invention will become apparent from a consideration of the accompanying drawing constituting a part hereof in which like reference characters designate like parts and in which:

Figure 1 is a cross sectional view of a pair of pressure platens of the hydraulic press or the like having a printing plate, and the materials from which the matrix is to be formed assembled in their proper position for subjecting them to pressure whereby they become united to form a unitary matrix member in accordance with the principles of this invention;

Figure 2 is a cross sectional view of the materials after they have been subjected to the pressure of the platens;

Figure 3 is a similar view of the formed matrix after it is removed from the press;

Figure 4 is a top plan view of the matrix as it is prepared for the forming of an electrodeposit on the matrix surface thereof; and, Figure 5 is a cross sectional view of the matrix shown in Figure 4.

With reference to Figure 1 of the drawing, the structure therein illustrated comprises a lower pressure platen 1, an upper platen 2, and an etching or type block 3 having a printing surface 4 which it is desired to reproduce.

A rubber liner 5 is disposed around the outer periphery of the block 3. A layer of wax of from approximately 1/16 to 3/32 inch thickness is then placed on the top surface of the etching or block 3, this layer of wax being designated by the reference numeral 6. The wax is extruded or rolled or both at a temperature of from 80° F. to 95° F. as a slab of the desired thickness from a compound consisting of 230 parts paraffine, 100 parts gilsonite, 35 parts Montan wax, 50 parts motor oil, 100% Pennsylvania heavy, or a proportionate amount of vaseline, and 25 parts of burgundy pitch or other casein product. These ingredients may be compounded in various proportions to produce a satisfactory product, for example, the burgundy pitch may be entirely eliminated and the proportions stated above are given as for a wax which has been proven highly satisfactory for the purpose herein stated.

The wax is compounded by mixing and melting the ingredients until they have thoroughly mixed and the compound is then filtered and extruded and/or rolled into slab form, as indicated.

Before placing the layer of wax 6 on the plate 3, the plate is brushed off with graphite both to prevent the adherence of the wax material thereto, and to apply an electrically conductive surface to the matrix surface of the wax after it is impressed into the plate 3.

A layer of paper 7 of sufficiently larger dimensions to form a considerable overlap with the wax layer is then placed on the top of the wax layer 6. The layer 7 may be of any suitable fibrous material such as paper or cloth or the like, and is placed on the wax in untreated form, there being no impregnation of the paper layer as was the case in the original application herein referred to.

After the paper layer 7 has been placed on the wax, a sheet of lead 8 of from 3 to 8 pounds per square foot is heated and then brushed off with wax on one side, the wax being wiped off and left as a very thin film which is placed adjacent the paper, and a relatively thick cork sheet 9 is placed on the lead and then the assembled sheet material is subjected to the pressure of platens 1 and 2, a pressure of approximately 400 to 1500 pounds per square foot being employed.

When subjected to the pressure of the platen, the wax layer 6 will be pressed into the concavities of the plate 3 in the manner shown in Figure 2, the paper layer 7 and the lead plate 8 conforming themselves to the contour or displacement of the wax layer 6. When the pressure platens 1 and 2 are separated, the compressed materials are removed from the etching or plate 3 leaving the matrix in the form shown in Figure 3 of the drawing.

After the impression is made on the wax, the surplus wax and paper are cut away as shown in Figures 4 and 5 of the drawing leaving the wax portion cut square as indicated by the line 10, Figure 4, which is approximately the same dimension as the plate 3. After the surplus wax and paper are removed, the border line 10 is painted with a conducting copper paint 11 which bridges over the edge of the wax 6 with the face of the lead plate 8. This copper paint prevents the electrolytic solution to which the matrix is subjected from entering the paper between the wax and the lead plate, and also acts as a conductor to aid in effecting the initial deposit of the copper on the matrix surface of the mold.

The wax employed for coating the lead plate after it is heated is preferably 4 parts of yellow beeswax and one part of burgundy pitch. This wax will melt on the surface of the lead plate when wiping the same, and the hot wax film will make a good bond to the back side of the paper.

By employing the wax sheet of a thickness and composition as herein stated, a matrix of clear sharp outlines may be produced without the formation of so-called bubbles or swellings and other distortions in the matrix surface. The paper 7 functions to permit the escape of any air which may be trapped between the wax and the inner face of the plate 3, and heating of the lead plate 8 causes the back side of the wax layer 6 to flow to readily conform itself to the contours of the plate 3.

By utilizing the cork layer 9, the lead plate 8 will adapt itself to the displacement of the wax as shown in the drawing which, of course, is grossly exaggerated for the purposes of illustration only. The conforming of the lead plate retards lateral flow or displacement of the wax.

The advantages of employing the single layer of paper with a substantial layer of wax over the composite form of matrix disclosed in the prior application herein referred to is in that better control of the wax is obtained and the heat of a lead plate such as the lead plate 8 may be more effectively applied to the wax with uniform results. Also, the product is cheaper to manufacture as it eliminates the compounding of the superposed layers of papers and wax as suggested in my prior disclosure.

Although one embodiment of the invention has been herein illustrated and described it will be obvious to those skilled in the art that various modifications may be made without departing from the principles herein set forth.

I claim:

1. The method of making composite matrices for electro-plates which comprises placing a layer of wax on an electro-plate, placing a layer of fibrous sheet material on said wax layer, placing a lead plate on said fibrous sheet material, and subjecting said superposed layers to heat and pressure to cause the wax to flow and form an imprint on the surface adjacent the electro-plate.

2. The method of forming composite matrices comprising a layer of wax on an etched plate, placing a layer of fiber sheet material on said wax layer, disposing a heated lead plate on said fiber sheet material and placing a relatively thick layer of cork or other elastic material on said lead plate disposing said assembled layers between the pressure platens of a press and subjecting them to the pressure of the press whereby the wax forms an imprint from said etching, and the superposed layers are joined with the exception of the relatively thick cork layer.

3. The method of forming composite matrices for electro-plates which comprises dusting off a pattern with graphite flake, placing a layer of wax sheet material thereon, placing a sheet of fibrous material on said wax layer, and preparing one surface of a lead plate with a film of wax which is placed adjacent the paper layer disposing a layer of relatively thick and pliable material over said lead plate, assembling said material between the pressure platens of the hydraulic press, and subjecting them to pressure whereby an imprint is formed on the surface of the wax, and the wax, paper and lead plate are caused to adhere to each other.

4. The method of making composite matrices for electro-plates which comprises placing a layer of wax on an electro-plate or the like, placing a layer of fibrous sheet material on said wax layer, the sheet material being of substantially greater area to extend beyond the layer of wax, placing a lead plate on said fibrous sheet material and subjecting said superposed layers to heat and pressure to cause the wax to flow and form an imprint on the surface adjacent the electro-plate.

5. The method of forming composite matrices for electro-plates which comprises dusting off a pattern with graphite flake, placing a layer of wax sheet material thereon, placing a sheet of fibrous material on said wax layer, and preparing one surface of a lead plate with a film of wax which is placed adjacent the paper layer disposing a layer of relatively thick and pliable material over said lead plate, assembling said material between the pressure platens of the hydraulic press, and subjecting them to pressure whereby an imprint is formed on the surface of the wax, and the wax, paper and lead plate are crossed to adhere to each other, trimming off the surplus edges of said paper and wax and bridging over the edge with a copper paint.

GUNNAR ROSENQVIST.